United States Patent [19]

van der Eerden, Henricus F. J. M.

[11] Patent Number: 4,635,317
[45] Date of Patent: Jan. 13, 1987

[54] DRUMSTICK CUTTER

[75] Inventor: van der Eerden, Henricus F. J. M., Boxtel, Netherlands

[73] Assignee: Stork PMT B. V., An Boxmeer, Netherlands

[21] Appl. No.: 720,677

[22] Filed: Apr. 8, 1985

[30] Foreign Application Priority Data

Apr. 9, 1984 [NL] Netherlands ............. 8401123

[51] Int. Cl.⁴ .................................. A22C 21/00
[52] U.S. Cl. .................................. 17/11; 17/12
[58] Field of Search ............. 17/11, 11 B, 12, 52; 83/268, 389, 409.1, 409.2, 460, 592

[56] References Cited

U.S. PATENT DOCUMENTS

| | | | |
|---|---|---|---|
| 2,926,383 | 3/1960 | Steck | 17/11 |
| 3,213,488 | 10/1965 | Volpe | 17/11 |
| 4,091,503 | 5/1978 | Fox et al. | 17/11 |
| 4,097,960 | 7/1978 | Graham et al. | 17/11 |

FOREIGN PATENT DOCUMENTS 149998  8/1981  German Democratic Rep. .... 17/12

Primary Examiner—Willie G. Abercrombie
Attorney, Agent, or Firm—Newton, Hopkins & Ormsby

[57] ABSTRACT

Device for cutting through the heel joint of the leg of slaughtered poultry which is supplied hanging by this leg, comprising a stop which is at an angle to the feed direction and an elongate cutting knife which reaches beyond the stop and is rotatably driven around an axis of rotation located in the feed direction in front, and sideways of the stop.

4 Claims, 4 Drawing Figures

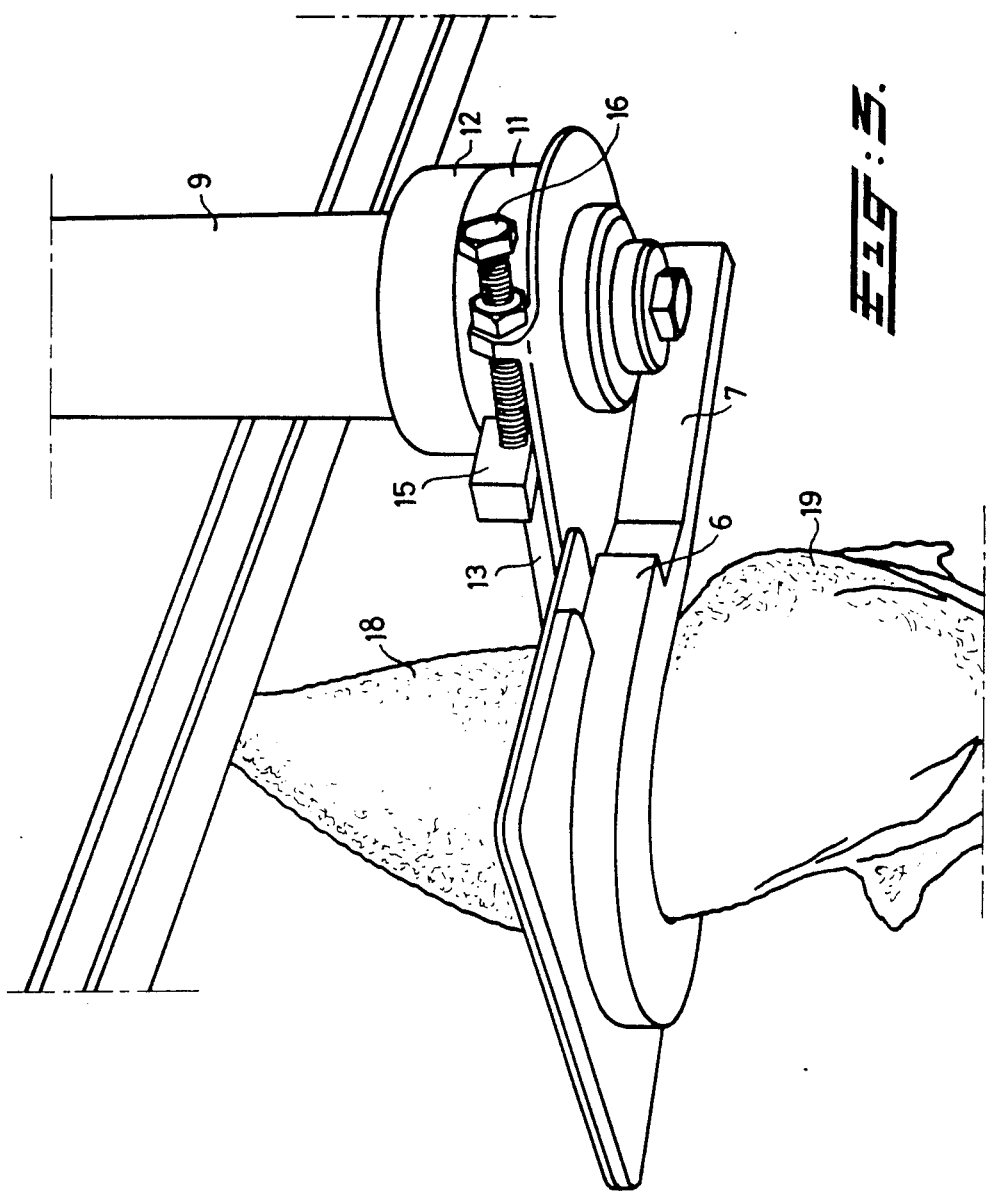

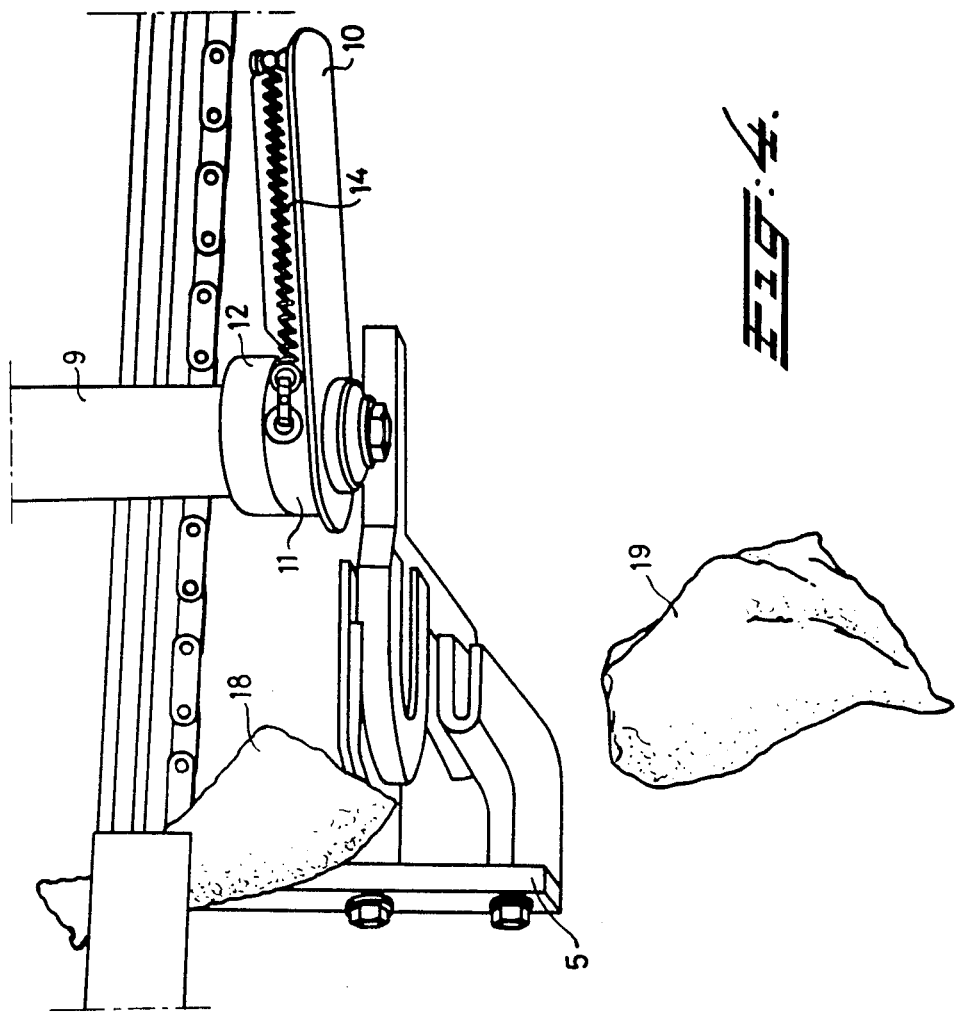

DRUMSTICK CUTTER

BACKGROUND OF THE INVENTION

The invention relates to a device for cutting through the heel joint of the leg of slaughtered poultry which is supplied hanging by his leg.

Leg parts of poultry are increasingly in demand as snacks and the need has therefore arisen for a device with which poultry legs can be accurately cut through at the heel joint.

DESCRIPTION OF THE PRIOR ART

This cutting operation has hitherto been carried out manually by holding the leg against a rotating cutting knife; this operation is however time-consuming and hence expensive and is moreover very dangerous.

SUMMARY OF THE INVENTION

The invention provides a device of this type. This device comprises, according to the invention, a stop which is at an angle to the feed direction and an elongate cutting knife which reaches beyond the stop and is rotatably driven around an axis of rotation located in the feed direction in front and sideways of the stop.

By means of the device according to the invention the heel joint is positioned between the stop on the one hand and the elongate, rotating cutting knife on the other hand and is subsequently cut through by the cutting knife which "overtakes" the leg. The positioning is further improved by employing an elongate pressure member which is rotatable through a limited angle about the axis of rotation, is coupled to the elongate knife via a spring element and is situated at a short distance from the knife. This element under spring pressure touches the leg before the knife reaches the latter and brings the joint into the stop and hence compensates for minor differences in length of the legs.

The stop preferably contains two knife parts which include a sharp angle. By means of these knife parts the skin on the front side of the joint is cut through before the elongate cutting knife has completely cut through the joint, and separation of the portions is improved.

The cutting edge of the elongate cutting knife is preferably designed so as to progressively recede starting from the part of the cutting knife located near the point of rotation, so that during its movement the cutting edge always stands substantially transversely to the direction of movement.

The rotation cutting knife is preferably driven in synchronisation with the track for the poultry so that it is always ensured that the cutting knife has cleared the passage when a leg arrives.

DESCRIPTION OF THE DRAWINGS

FIG. 1 is a diagrammatic top view of the device according to the invention.

FIG. 3 is a first perspective view of the embodiment according to the invention;

FIG. 4 is a second perspective view of this embodiment.

DESCRIPTION OF A PREFERRED EMBODIMENT

Figure 2:
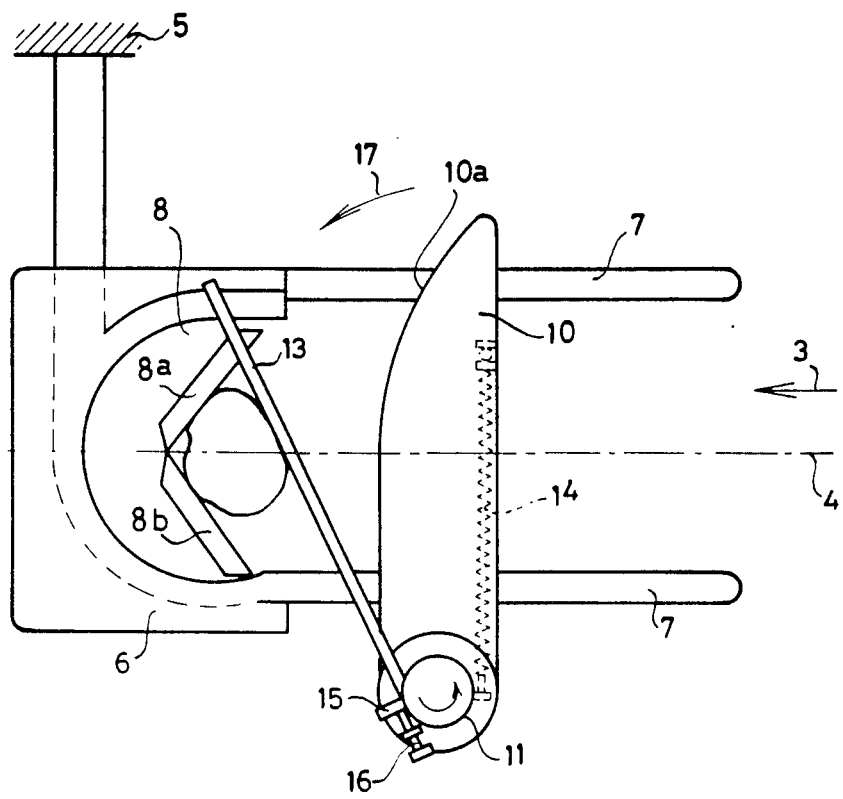
FIG. 2 is a diagrammatic side view of this device.
Figure 2:
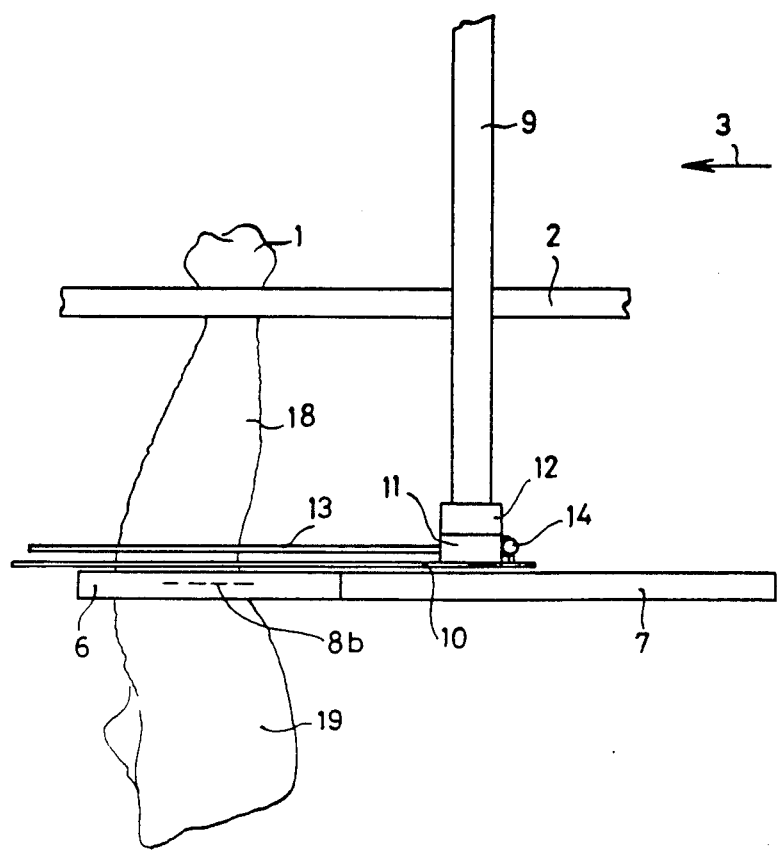

The poultry part to be processed is fed, hanging by a leg 1 on the conveyor track 2 (see FIG. 2), in the direction of arrow 3 and follows a path which is shown by the dash-dotted line 4 in FIG. 1. The device for cutting through the heel joint consists of a holder 6 which is fastened to a frame part 5 (shown diagrammatically) and has two elongate feed guides 7 and a stop 8, in which two cutting knives 8a, 8b are accomodated, the cutting edges of which are at a sharp angle to the track 4. The device moreover comprises a vertical, rotatably driven drive shaft 9 which crosses the feed track 4 and carries at its lower end the elongate cutting knife 10. The cutting edge 10a thereof recedes progressively, preferably following the shape of an involute, starting from the part located near the shaft 9. Above this knife is located a bearing bush 11 which is freely rotatable about the shaft and is enclosed between the knife 10 and a retaining bush 12 located above the knife and fixed on the shaft; this bush 11 carries an elongate pressure member 13 which is located above the knife 10 and parallel thereto. The bush 11 is coupled to the knife 10 via the tension spring 14; a stop 15 cooperating with an adjustment screw 16 attached to the knife 10 limits the angle through which the pressure member 13 can rotate about the shaft 9 relative to the knife 10.

The device operates as follows:

The shaft 9 is continuously driven rotatably in the direction of arrow 17 from the drive (not shown) of the track 2, as a result of which the "phase difference" between the positions of the drivers of the track with the birds hanging on the latter and the position of the rotating knife respectively can be adjusted. The device is installed at an adjustable distance from the conveyor track 2 such that the leg arrives with its heel joint at the height of the stop 8 containing the knives 8a, 8b. Thereafter, the joint is pressed resiliently against this stop by the pressure member 13, while the latter presses into the V-shaped space, positions the joint and compensates for minor differences in lengths of the legs. The knives 8a, 8b cut into the skin and the heel joint is cut through from behind by the cutting edge 10a of the cutting knife 10, which edge "overtakes" the joint during its movement. The uppermost leg portion 18 (the drumstick) is carried along by the conveyor track and the lowermost leg portion 19 falls into a discharge gutter (not shown).

What is claimed is:

1. A device for cutting through the heel joint of a leg of slaughtered poultry which is suspeneded from a conveyor track by the legs and transported in a forward direction comprising:
    a poultry leg stop located below the conveyor track and being approximately aligned with the leg joint to be cut;
    a vertically extending rotatable drive shaft;
    a rotatale elongate cutting knife mounted on the drive shaft having an axis of rotation parallel to the conveyor track and rotating in the same direction as the conveyor track, the cutting knife being in alignment with the joint to be cut; and
    a rotatable elongate pressure member spring-mounted on the drive shaft a short axial distance from the cutting knife and being partially rotatable about an axis of rotation parallel to that of the cutting knife, the pressure member also being attached to the cutting knife in such a manner as to precede the cutting knife as the pressure member and knife are rotated about the drive shaft until the pressure member presses against the poultry part to be cut.

2. The device according to claim 1, wherein the poultry leg stop lies in a plane below the plane of the cutting knife and the pressure member lies in a plane above the plane of the cutting knife.

3. The device according to claim 1, wherein the poultry leg stop includes a V-shaped cutting blade.

4. The device according to claim 1, wherein the end of the cutting knife distal to the drive shaft has a curved cutting edge.

* * * * *